United States Patent [19]
Shibazaki

[11] Patent Number: 6,012,069
[45] Date of Patent: Jan. 4, 2000

[54] METHOD AND APPARATUS FOR RETRIEVING A DESIRED IMAGE FROM AN IMAGE DATABASE USING KEYWORDS

[75] Inventor: Hiroshi Shibazaki, Kyoto, Japan

[73] Assignee: Dainippon Screen Mfg. Co., Ltd., Japan

[21] Appl. No.: 09/012,987

[22] Filed: Jan. 26, 1998

[30] Foreign Application Priority Data

Jan. 28, 1997 [JP] Japan ................................... 9-029789

[51] Int. Cl.⁷ .................................................. G06F 17/30
[52] U.S. Cl. .............................. 707/104; 707/3; 707/5; 707/526; 345/339
[58] Field of Search ...................... 707/3, 5, 200, 707/530, 526, 104; 345/339

[56] References Cited

U.S. PATENT DOCUMENTS

| 4,999,790 | 3/1991 | Murayama et al. | 707/3 |
| 5,361,204 | 11/1994 | McCollough et al. | 707/530 |
| 5,367,672 | 11/1994 | Takagi | 707/3 |
| 5,459,829 | 10/1995 | Doi et al. | 395/120 |
| 5,546,572 | 8/1996 | Seto et al. | 707/5 |
| 5,553,277 | 9/1996 | Hirano et al. | 707/104 |
| 5,625,810 | 4/1997 | Kurosu et al. | 707/1 |
| 5,628,003 | 5/1997 | Fujisawa et al. | 707/104 |
| 5,684,999 | 11/1997 | Okamoto | 704/9 |
| 5,713,021 | 1/1998 | Kondo et al. | 707/103 |
| 5,729,715 | 3/1998 | Ina et al. | 711/162 |
| 5,761,655 | 6/1998 | Hoffman | 707/4 |
| 5,886,698 | 3/1999 | Sciammarella et al. | 345/349 |
| 5,943,443 | 8/1999 | Itonori et al. | 382/225 |

*Primary Examiner*—Jean R. Homere
*Attorney, Agent, or Firm*—Ostrolenk, Faber, Gerb & Soffen, LLP

[57] ABSTRACT

In a tendency search phase, the user tentatively selects at least a predetermined number of plural images among displayed images. A computer system checks keywords of the tentatively selected images, which have been registered previously in an image database, in order to extract a common keyword that is common to the tentatively selected images. The computer system subsequently allocates first priorities to a plurality of images to be displayed as next candidates, based on the closeness of the images to the common keyword. In a relation extraction phase, the computer system displays the tentatively selected images as well as at least part of the plurality of images to be displayed as next candidates according to the first priorities. The user definitely selects at least one image among the plurality of images thus displayed.

17 Claims, 14 Drawing Sheets

STRUCTURE OF IMAGE DATABASE 38

IMAGE DATA FILE GROUP 50

TEXTURE KEYWORD TABLE 52

Fig. 3(A)

| KEYWORD GROUP 1 |
| KEYWORD GROUP 2 |
| . . . |
| KEYWORD GROUP M |

Fig. 3(B)

| GENERAL CLASS KEYWORD (FIRST HIERARCHY) |
| CONCRETE KEYWORD GROUP (SECOND HIERARCHY) |
| RELATED KEYWORD GROUP |

Fig. 3(C)

| Mountain |
| Mt. Fuji<br>Mt. Hiei<br>Mt. Atago |
| (Mountain)<br>Woods<br>River<br>Sea |

Fig. 3(D)

| Sea |
| Suruga Bay<br>Osaka Bay<br>Setonaikai |
| (Sea)<br>Lake<br>Beach<br>Mountain |

SENSITIVITY KEYWORD TABLE 1

SENSITIVITY COORDINATE SYSTEM

Fig. 7(A)

IMAGE DATA MANAGEMENT TABLE
FOR TENDENCY SEARCH PHASE

| Number | Image Data Number | Priority | Selection/Display Flags |
|---|---|---|---|
| 1 | #5 | — | 0 |
| 2 | #8 | — | 0 |
| R | #98 | — | 0 |

0: NOT YET DISPLAYED
1: ONCE DISPLAYED (BUT NOT SELECTED)
2: DISPLAYED IN NON-SELECTED STATE
3: DISPLAYED IN TENTATIVELY SELECTED STATE

Fig. 7(B)

AFTER ALLOCATION OF PRIORITIES

| Number | Image Data Number | Priority | Selection/Display Flags |
|---|---|---|---|
| 1 | #5 | *26 | 0 |
| 2 | #8 | *1 | 0 |
| R | #98 | *8 | 0 |

Fig. 7(C)

SORTING

| Number | Image Data Number | Priority | Selection/Display Flags |
|---|---|---|---|
| 1 | #8 | *1 | 0 |
| 2 | #21 | *2 | 0 |
| R | #63 | *R | 0 |

Fig. 8(A)  EXAMPLE OF FIRST DISPLAY
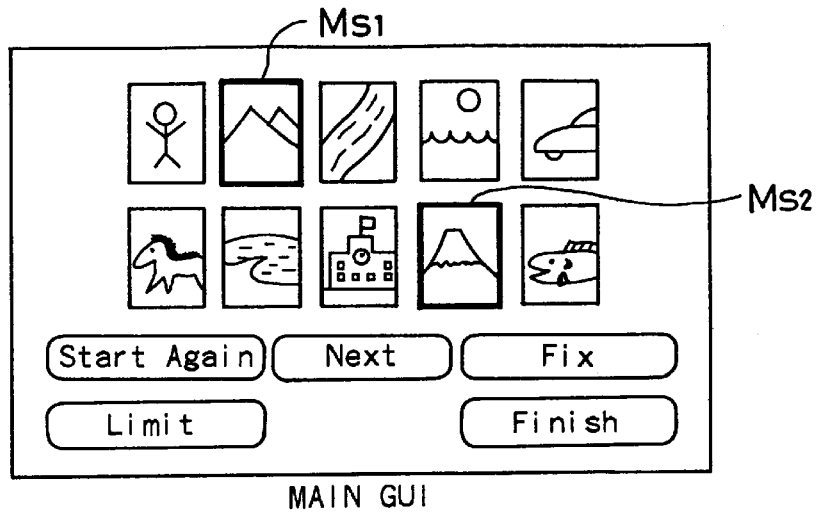
MAIN GUI
Fig. 8(B) FIRST REDISPLAY (TENDENCY SEARCH PHASE)
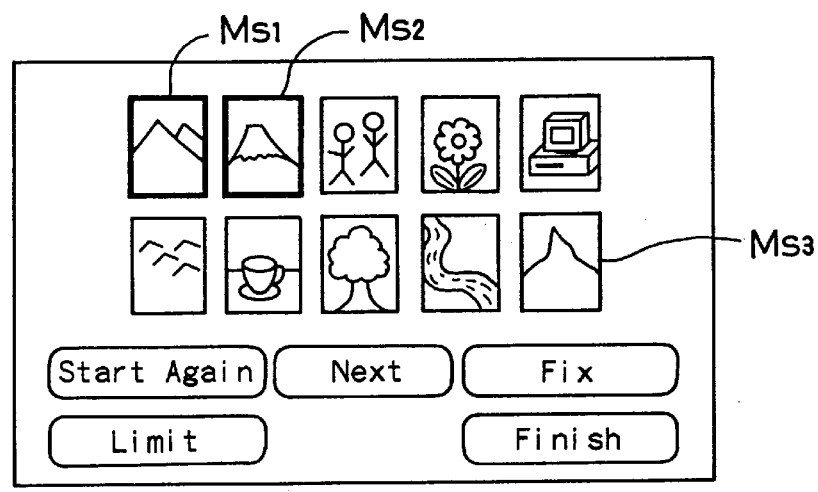
Fig. 8(C) SECOND REDISPLAY (RELATION EXTRACTION PHASE)
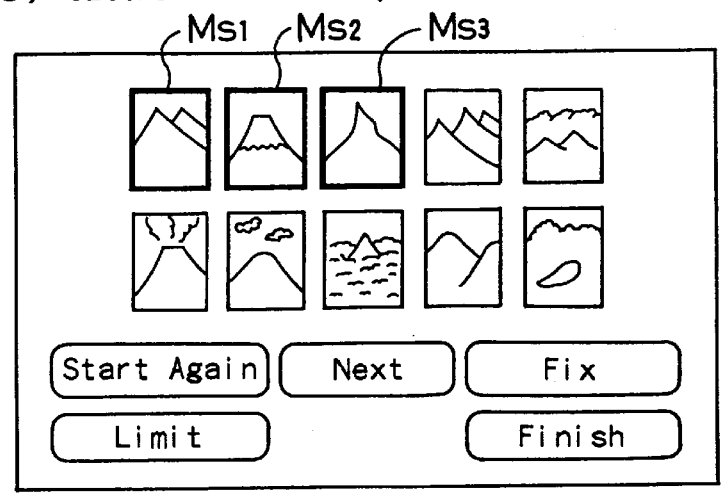

Fig. 11(A) EXAMPLE OF FIRST DISPLAY
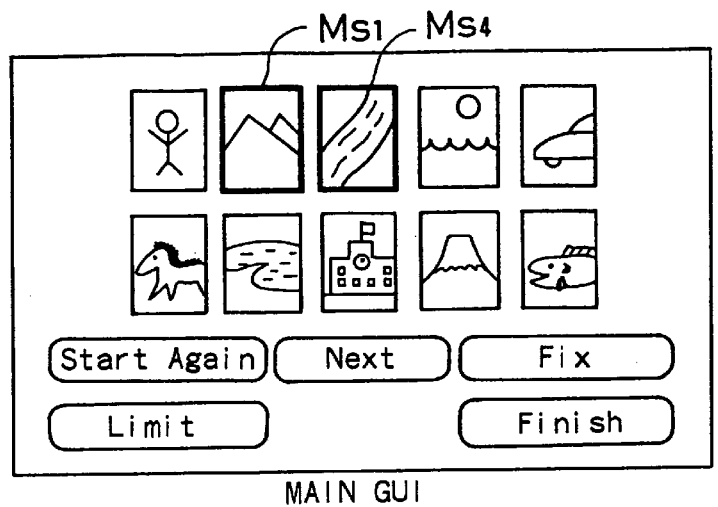
MAIN GUI
Fig. 11(B) FIRST REDISPLAY (TENDENCY SEARCH PHASE)
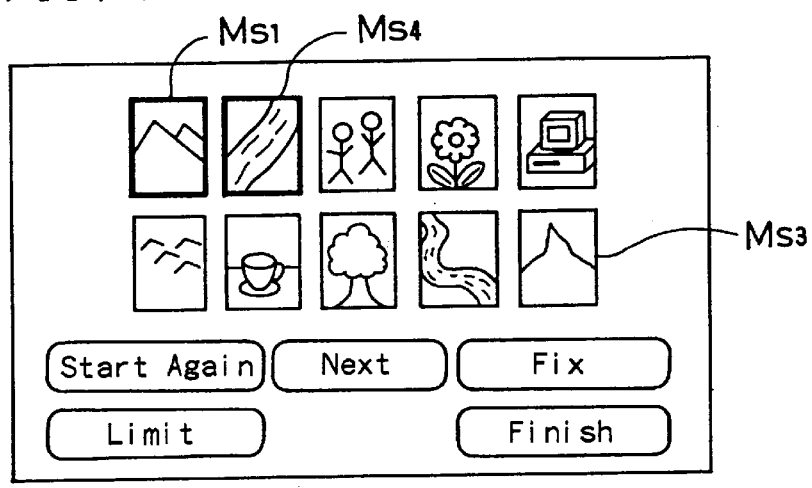
Fig. 11(C) SECOND REDISPLAY (RELATION EXTRACTION PHASE)
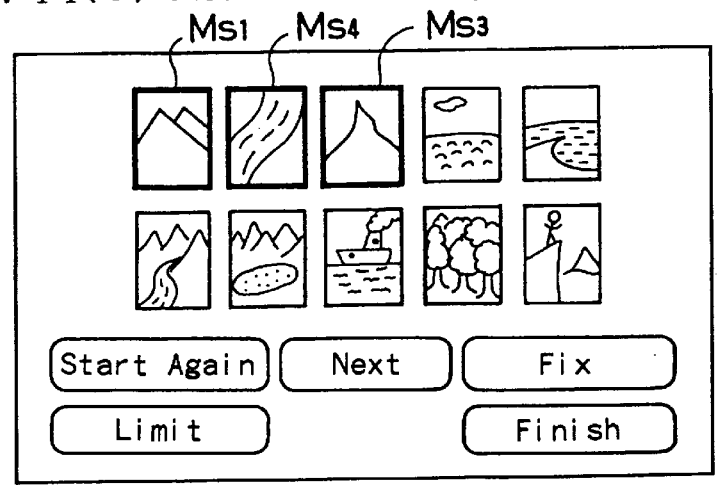

Fig. 12
FIRST EXAMPLE OF CLASSIFICATION
- COMMON KEYWORDS: CONCRETE KEYWORD a1 AND
                   SENSITIVITY KEYWORD $\beta 1$
- RELATION OF KEYWORDS:
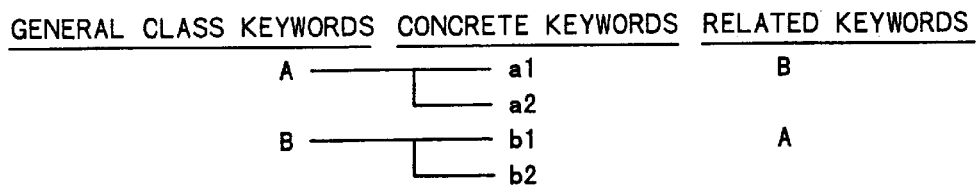
Keyword $\beta 2$ is proximate to sensitivity keyword $\beta 1$.
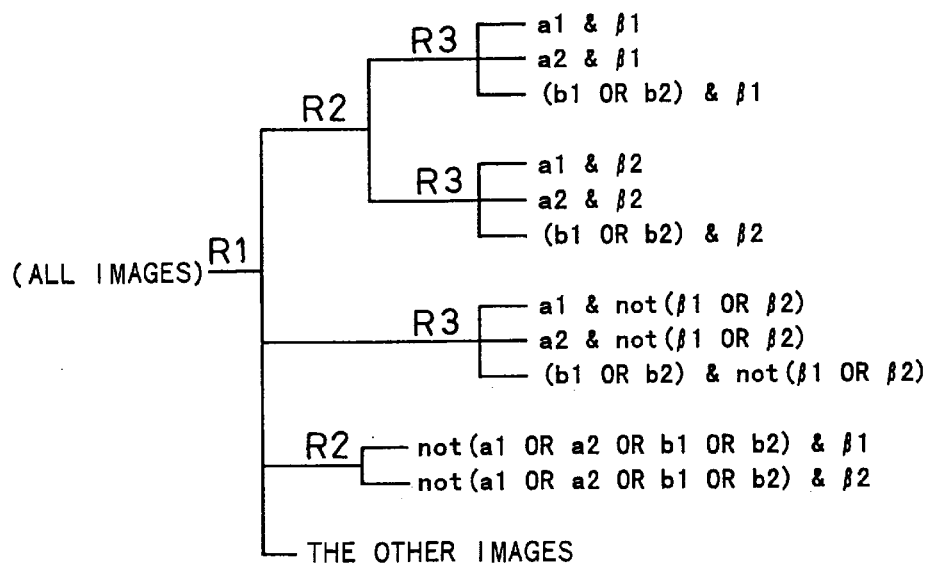

Fig. 13
SECOND EXAMPLE OF CLASSIFICATION
- COMMON KEYWORDS: GENERAL CLASS KEYWORD A AND
   SENSITIVITY KEYWORD $\beta 1$
- RELATION OF KEYWORDS:
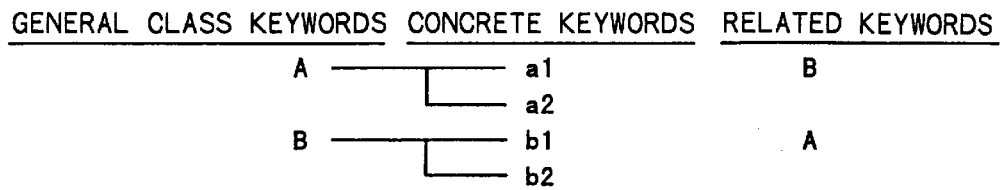
Keyword $\beta 2$ is proximate to sensitivity keyword $\beta 1$.
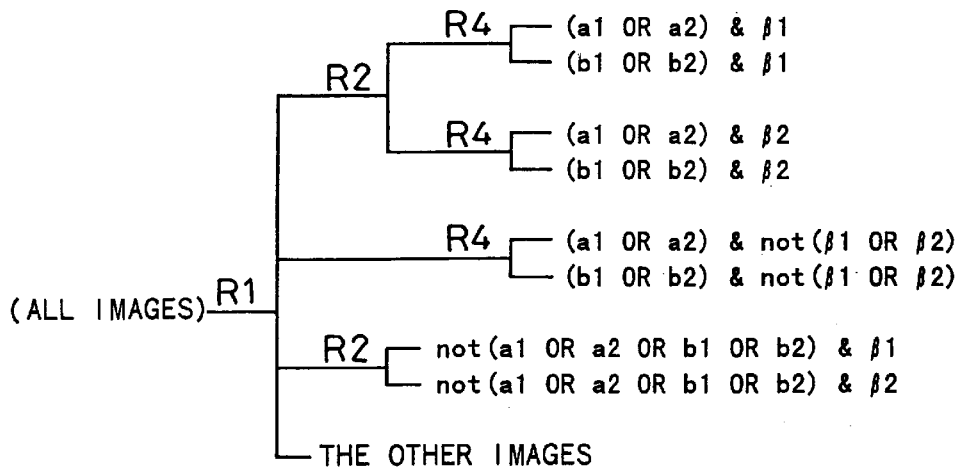

Fig. 14

THIRD EXAMPLE OF CLASSIFICATION

- COMMON KEYWORDS: RELATED KEYWORDS A AND B
  AND SENSITIVITY KEYWORD $\beta 1$
- RELATION OF KEYWORDS:

| GENERAL CLASS KEYWORDS | CONCRETE KEYWORDS | RELATED KEYWORDS |
|---|---|---|
| A | a1 | B |
|   | a2 |   |
| B | b1 | A |
|   | b2 |   |

Keyword $\beta 2$ is proximate to sensitivity keyword $\beta 1$.

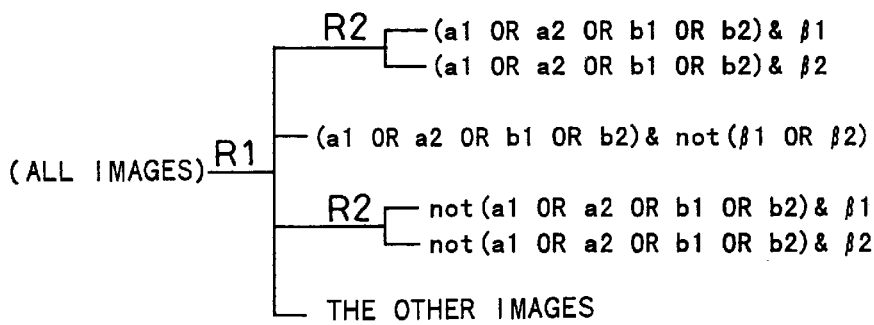

```
                 R2 ┬─ (a1 OR a2 OR b1 OR b2) & β1
                    └─ (a1 OR a2 OR b1 OR b2) & β2
              ┌─ (a1 OR a2 OR b1 OR b2) & not(β1 OR β2)
(ALL IMAGES) R1
              │  R2 ┬─ not(a1 OR a2 OR b1 OR b2) & β1
              │     └─ not(a1 OR a2 OR b1 OR b2) & β2
              └─ THE OTHER IMAGES
```

METHOD AND APPARATUS FOR RETRIEVING A DESIRED IMAGE FROM AN IMAGE DATABASE USING KEYWORDS

BACKGROUND OF THE INVENTION

1. Field of the Invention

The present invention relates to image retrieval from an image database using keywords.

2. Description of the Related Art

In image retrieval from an image database, the necessity of higher efficiency increases as the number of image data in the database increases. A general procedure of image retrieval comprises: specifying some of the keywords, which have previously been given to the respective images, and retrieving an image having the specified keywords.

In some cases, a user cannot clearly recognize the user's own desire nor input any specific keyword for retrieval of a desired image, but has only ambiguous requirements to the image to be retrieved. In a conventional procedure applied for such cases, the user successively checks displayed images to find an image that meets the ambiguous requirements.

In these cases, however, it is difficult to extract an image that meets the user's vague requirements from the image database and display it with a high efficiency. The retrieval is accordingly very time-consuming.

SUMMARY OF THE INVENTION

Accordingly, an object of the present invention is to enable a user to efficiently retrieve an image that meets the user's ambiguous requirements.

In order to attain at least part of the above and other objects of the present invention, there is provided a method of retrieving a desired image from an image database, the image database storing a plurality of images and keywords of the plurality of images. The method comprises the steps of: (a) displaying at least part of a number of images stored in the image database on a display device and tentatively selecting at least a predetermined number of images among the images displayed on the display device; (b) checking keywords of the tentatively selected images to extract a common keyword that is common to the tentatively selected images; (c) allocating first priorities to a plurality of images-to-be-displayed as next candidates based on closeness of each image to the common keyword; (d) displaying the tentatively selected images as well as at least part of the plurality of images-to-be-displayed as next candidates on the display device according to the first priorities; and (e) definitely selecting at least one image among the images displayed on the display device.

Even when a user has only ambiguous requirements, it is possible for the user to tentatively select a plurality of images that meet the ambiguous requirements to some extent. A common keyword that is common to the tentatively selected images fairly satisfies the user's vague requirements. First priorities are allocated to the respective images based on the closeness of the images to the common keyword, and images extracted according to the first priorities are displayed as next candidates. This feature enables the images that fairly meet the user's requirements to be preferentially displayed. The user then definitely selects an image that perfectly satisfies the user's vague requirements among the displayed images.

When the tentatively selected images have a plurality of common keywords, the step (c) may allocate the first priority to each of the plurality of images-to-be-displayed as next candidates at least according to the number of the common keywords possessed by each of the plurality of images-to-be-displayed. It is considered that the images having a greater number of keywords have a higher degree of matching with the user's requirements. Allocating the higher priorities to the images having a greater number of keywords thus enables the images that well meet the user's requirements to be displayed preferentially.

According to an aspect of the present invention, an evaluation order to be used in the allocation of the first priority may be determined in advance with respect to various types of the plurality of common keywords; and the step (c) may allocate the first priority to each of the plurality of images-to-be-displayed as next candidates according to the number of the common keywords possessed by each of the plurality of images and the evaluation order. This feature enables the first priorities to be more appropriately allocated to the next candidate images.

In a preferred embodiment, the keywords are classified into a first class keyword that has a direct relation to the contents of each image and a second class keyword that has no direct relation to the contents of the image but has a relation to the first class keyword; and the first class keyword has a higher evaluation order than that of the second class keyword. Using the first class keyword and the second class keyword enables the extraction of appropriate keywords satisfying the user's vague requirements. Since the first class keyword has a direct relation to the contents of each image, allocation of the higher evaluation order to the first class keyword than that to the second class keyword ensures appropriate allocation of the first priorities.

The above method may further comprises the step of: extracting the images-to-be-displayed as next candidates from the image database in advance through retrieval with an input keyword. This feature previously restricts the images displayed on the display device, thereby enabling more efficient retrieval of the image that meets the user's requirements.

The step (a) may comprise the steps of: allocating second priorities for tentative selection to the images-to-be-displayed on the display device, so as not to display images having close relations to one another in a successive manner; and successively displaying the images-to-be-displayed on the display device according to the second priorities. Accordingly, a variety of images having different contents can be displayed at the time of the tentative selection before the extraction of a common keyword. This feature enables the user to carry out the tentative selection among the variety of different images.

When the number of the tentatively selected images is less than the predetermined number, the step (a) may display the tentatively selected images and other images according to the second priorities. This feature enables a variety of images having different contents to be successively displayed until the number of the tentatively selected images reaches the predetermined number.

The step (d) may comprises the steps of: adding another tentatively selected image from the displayed images; and displaying all the tentatively selected images and other images according to the first priorities. This feature enables the user to observe both the tentatively selected images and the images displayed as next candidates and to readily and definitely select an image that meets the user's ambiguous requirements.

These and other objects, features, aspects, and advantages of the present invention will become more apparent from the following detailed description of the preferred embodiments with the accompanying drawings.

BRIEF DESCRIPTION OF THE DRAWINGS

FIGS. 3(A)–3(D) show the contents of a texture keyword table 52;

FIGS. 7(A)–7(C) show a process of creating an image data management table for tendency search phase;

FIGS. 8(A)–8(C) show a process of displaying a variety of images on the main GUI in the course of fuzzy retrieval;

FIGS. 11(A)–11(C) show successive displays of images when an image Ms4 on the center in the upper row is selected instead of an image Ms2 on the second right in the lower row during the first display shown in FIG. 8(A);

FIG. 12 shows a first example of classification when rules R1 through R5 are applied successively in the process of creating an image data management table for relation extraction phase;

FIG. 13 shows a second example of classification of images; and

FIG. 14 shows a third example of classification of images.

DESCRIPTION OF THE PREFERRED EMBODIMENT

A. Structure and Operation of Embodiment

Figure 1:
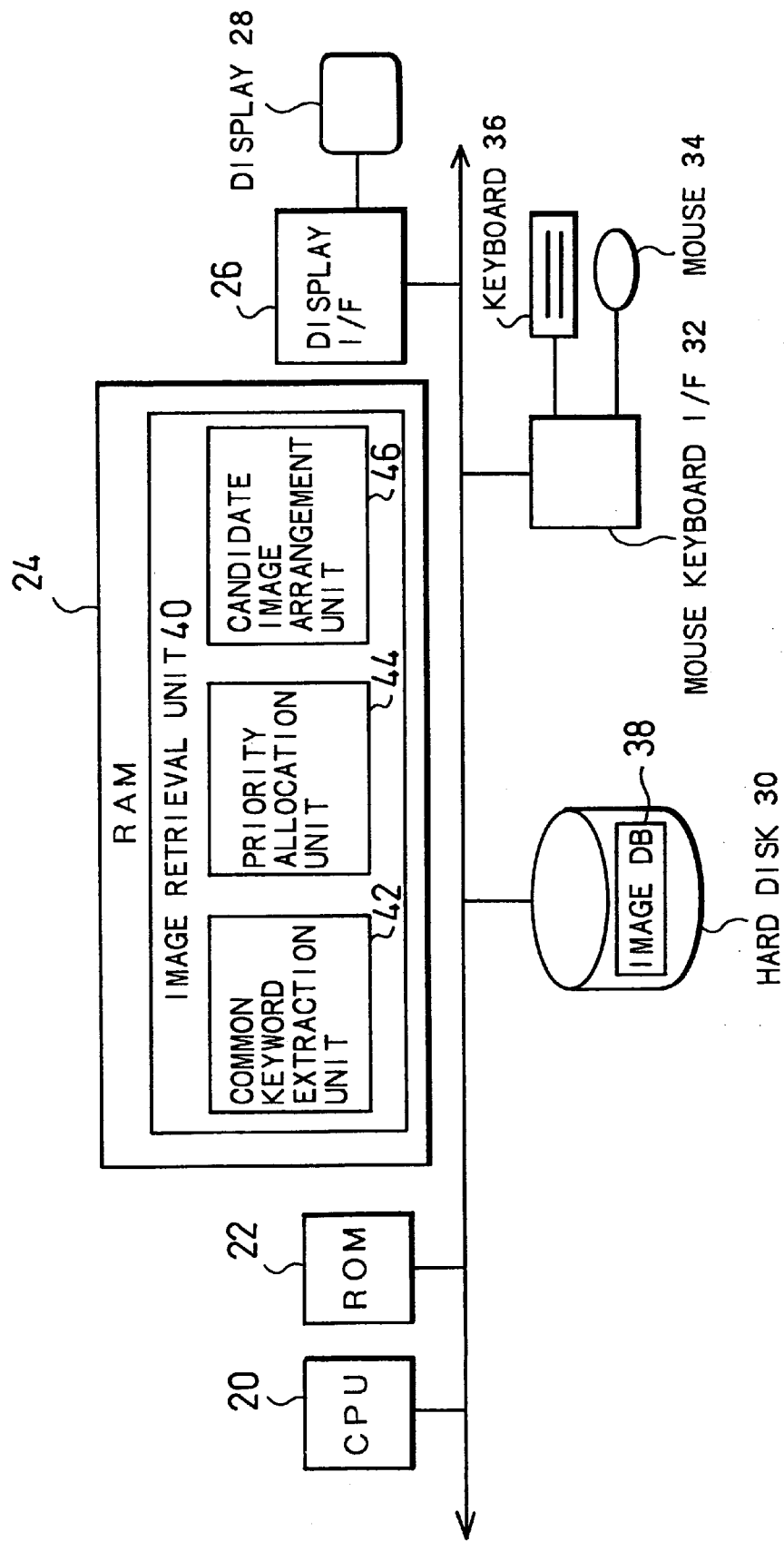
FIG. 1 is a block diagram illustrating the structure of an image retrieval system embodying the present invention.

FIG. 1 is a block diagram illustrating the structure of an image retrieval system embodying the present invention. The image retrieval system is constructed as a computer system including a CPU 20, a ROM 22 and a RAM 24 as main memories, a display interface 26, a color display 28 connected to the display interface 26, a hard disk 30 as an external storage device, a mouse/keyboard interface 32, and a mouse 34 and a keyboard 36 connected to the interface 32.

In this embodiment, the color display 28 is used as the display unit for displaying images, whereas the mouse 34 or the keyboard 36 is used as the selection unit for enabling the user to select a desired image among a plurality of displayed images. Computer programs functioning as an image retrieval unit 40 are stored in the RAM 24. The image retrieval unit 40 includes a common keyword extraction unit 42, a priority allocation unit 44, and a candidate image arrangement unit 46.

The computer programs (applications programs) for implementing the functions of the respective units are stored on a portable storage medium, such as floppy disks or CD-ROMs, and transferred from the storage medium to the external storage device of the computer system. Alternatively the computer programs may be supplied from a program supply apparatus to the computer system via a communications path. The computer programs are transferred from the external storage device to the main memory and stored therein to be executed. In the specification hereof, the computer system implies both the hardware and its operating system, and more specifically it represents the hardware operating under the control of the operating system. The applications programs enable the computer system to implement the functions of the respective constituents. Part of these functions may be executed by the operating system instead of the applications programs.

The 'storage medium' in the present invention is not restricted to the portable storage medium discussed below, but includes a variety of internal storage devices in the computer, for example, RAMs and ROMs, and external storage devices, such as hard disks, connected to the computer. Namely the 'storage medium' of the present invention implies any computer readable medium.

Figure 2:
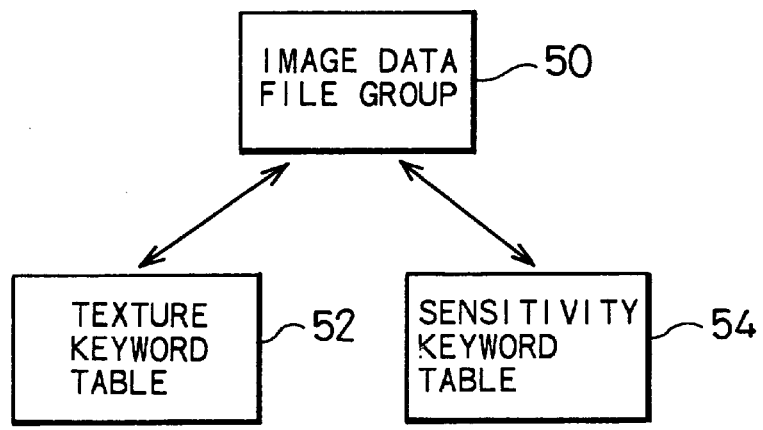
FIGS. 2(A) and 2(B) show the structure of an image database 38.
Figure 2:
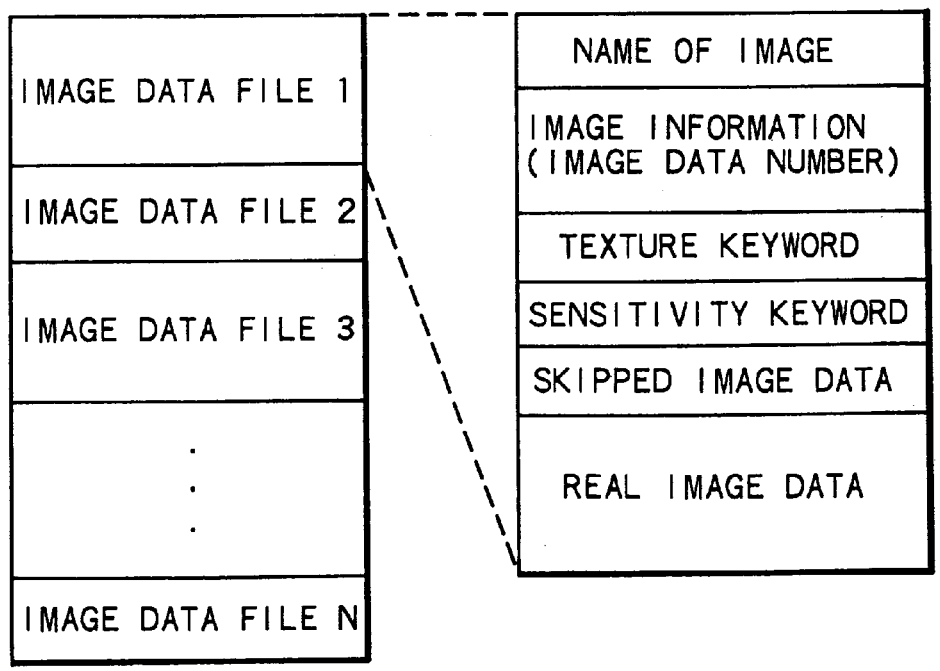

An image database 38, in which a large number of images are registered, is stored in the hard disk 30. FIGS. 2(A) and 2(B) show the structure of the image database 38. The image database 38 stores a group of image data files 50, a texture keyword table 52, and a sensitivity keyword table 54. The group of image data files 50 are related to both the texture keyword table 52 and the sensitivity keyword table 54. The contents of the texture keyword table 52 and the sensitivity keyword table 54 will be described later.

FIG. 2(B) shows the contents of the group of image data files 50. Each image data file of the group 50 includes a name of the image, image information, a texture keyword, a sensitivity keyword, skipped image data, and real image data. The image information includes an image data number of the image (that is, a serial number allocated to the image) as well as a variety of data regarding, for example, a resolution [dots/inch], a type of colorimetric system (for example, CMYK calorimetric system or RGB colorimetric system), and the size of the image. The details of the keywords will be described later. The skipped image data represents a reduced image obtained by skipping the whole real image data at a predetermined skipping ratio (for example, 1/5). Each image displayed on the color display 28 in the course of retrieval is based on this skipped image data. When a specific image is finally selected, the real image data corresponding to the selected image is read from the image database 38.

FIGS. 3(A)–3(D) show the contents of the texture keyword table 52. Referring to FIG. 3(A), a plurality of keyword groups are registered in the texture keyword table 52. Each keyword group includes, as shown in FIG. 3(B), a general class keyword (first hierarchical keyword), a group of concrete keywords (second hierarchical keywords), and a group of related keywords. FIGS. 3(C) and 3(D) show examples of such keyword groups. In the keyword group of FIG. 3(C), the general class keyword is 'Mountain', and names of concrete mountains, such as 'Mt. Fuji', 'Mt. Hiei', and 'Mt. Atago', are registered as the concrete keywords belonging to the general class keyword 'Mountain'. The group of related keywords includes, for example, 'Woods', 'River', and 'Sea'. The general class keyword itself (for example, 'Mountain') is also included in the group of related keywords in a broader sense. The group of related keywords in a narrower sense, on the other hand, does not include the general class keyword itself. In the example of FIG. 3(C), the keyword 'Mountain' in parentheses is found in the group of related keywords. This means that the keyword 'Mountain' is included in the group of related keywords in a broader sense. In the keyword group of FIG. 3(D), the general class keyword is 'Sea', and names of concrete seas, such as 'Suruga Bay', 'Osaka Bay', and Setonaikai', are registered as concrete keywords belonging to the general class keyword 'Sea'. The group of related keywords includes, for example, 'Lake', 'Beach', and 'Mountain'. Like the example of FIG. 3(C), the general class keyword 'Sea' is included in the group of related keywords in a broader sense.

The concrete keyword and the general class keyword are first class keywords that have direct relations to the contents of each image. For example, the concrete keyword 'Mt. Fuji' and the general class keyword 'Mountain' are allocated to an image including Mt. Fuji. A plurality of concrete keywords or a plurality of general class keywords may be allocated to one image. As clearly understood from these examples, the concrete keywords are proper nouns, whereas the general class keywords are common nouns. The general class keyword is the upper concept of the concrete keywords. These keywords are also called 'texture' keywords because the contents of an image are often referred to as 'texture' in the field of image processing.

In these examples, the first class keywords having direct relations to the contents of an image consist of the general class keyword and the concrete keyword in the hierarchical structure. They may, however, be expressed in a one-layer structure. For example, 'Mountain' and 'Mt. Fuji' may be registered as the keywords of the same level.

The related keywords do not have direct relations to the contents of an image, but have conceptual relations to the general class keyword. In the example of FIG. 3(C), 'Woods', 'River', and 'Sea' are registered as the keywords having the relations to the general class keyword 'Mountain'. Even when the image including Mt. Fuji does not include any woods, rivers, or sea, 'Woods', 'River', and 'Sea'. are registered as the group of related keywords.

Each image data file shown in FIG. 2(B) should include at least a concrete keyword as the texture keyword. By referring to the texture keyword table 52 shown in FIGS. 3(A)–3(D) with the concrete keyword, a general class keyword and a group of related keywords with respect to the concrete keyword can be obtained.

Figure 4:
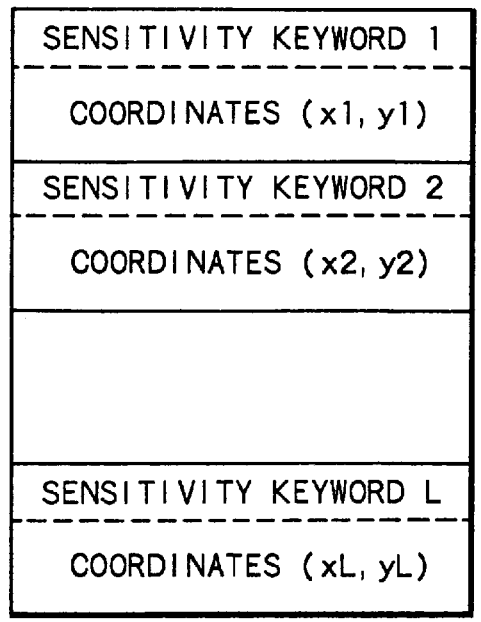
FIGS. 4(A) and 4(B) show the contents of a sensitivity keyword table 54.
Figure 4:
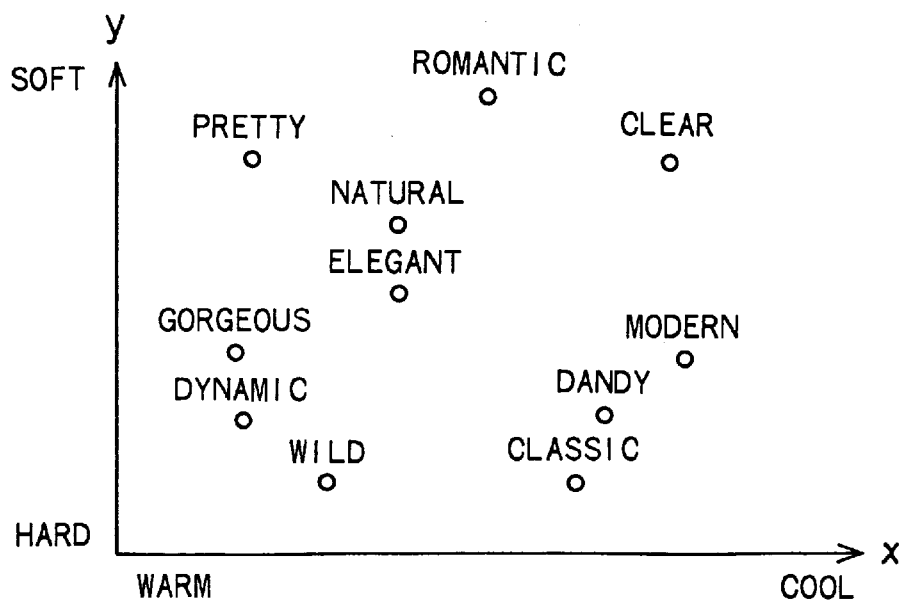

FIGS. 4(A) and 4(B) show the contents of the sensitivity keyword table 54. In the sensitivity keyword table 54, coordinate values on a sensitivity coordinate system are registered to each sensitivity keyword. FIG. 4(B) shows the sensitivity coordinate system. The x axis in the sensitivity coordinate system is a 'Warm' to 'Cool' axis, whereas the y axis is a 'Hard' to 'Soft' axis. The sensitivity keyword of each image is determined according to the statistical values (for example, the mean value and the peak value) of colors included in each image. For example, the coordinate values close to 'Warm' and 'Soft' are allocated to an image with full of orange colors, and the coordinate values close to 'Cool' and 'Hard' are allocated to an image with full of blue colors. The coordinates of various sensitivity keywords are shown in FIG. 4(B).

The texture keyword and the sensitivity keyword of each image are registered in the image data file as shown in FIG. 2(B). The texture keyword is also registered in the texture keyword table 52 shown in FIGS. 3(A)–3(D), while the sensitivity keyword is registered in the sensitivity keyword table 54 shown in FIGS. 4(A) and 4(B). It is not necessary to register the sensitivity keyword in the image database 38, but registration of a keyword having direct relations to the contents of the image, that is, a texture keyword, is sufficient.

Figure 5:
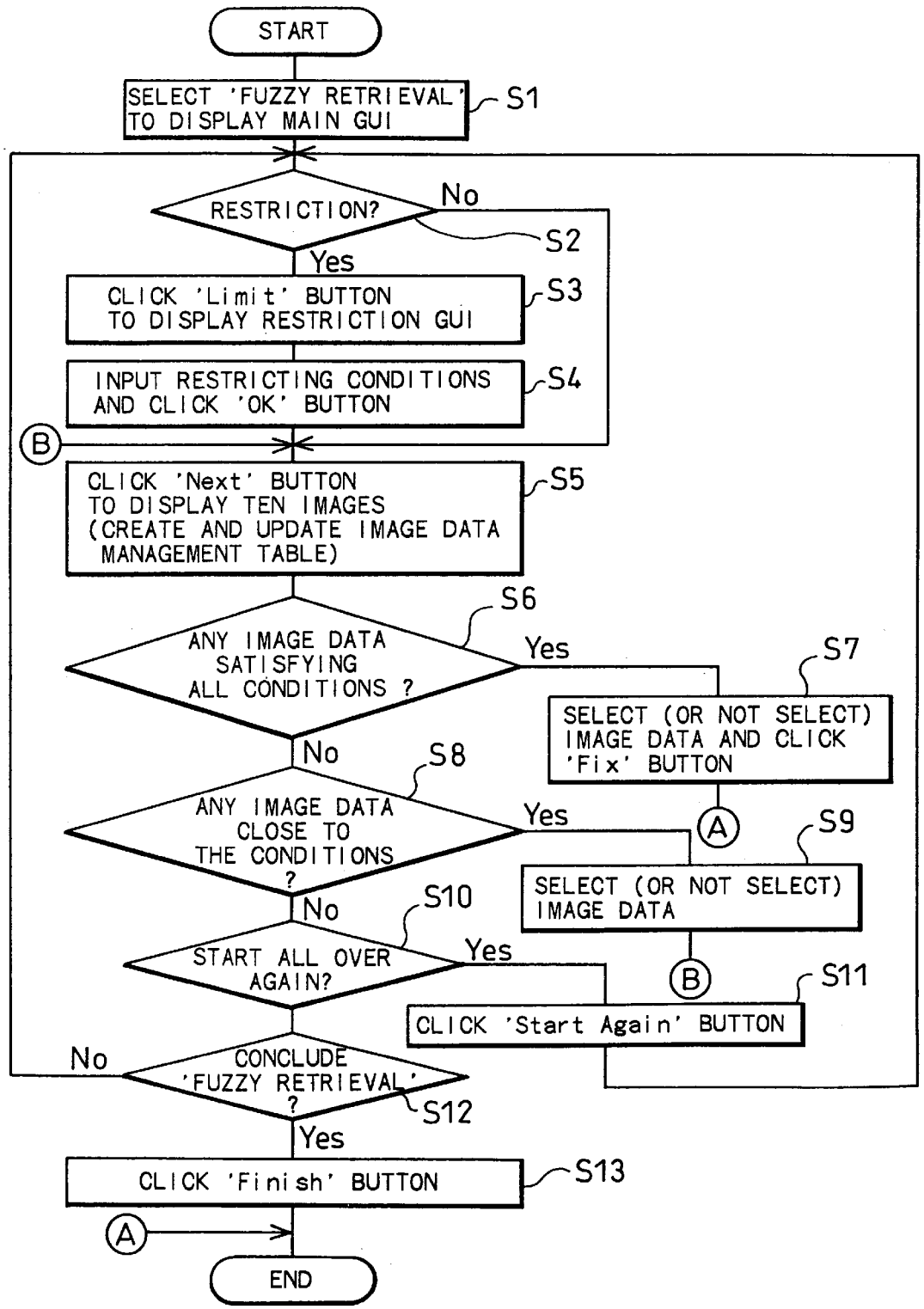
FIG. 5 is a flowchart showing a routine of image retrieval process carried out by an image retrieval unit 40.

FIG. 5 is a flowchart showing a routine of image retrieval process carried out by the image retrieval unit 40. At step S1, the user inputs selection of 'Fuzzy Retrieval' into the image retrieval system, and a main graphical user interface (hereinafter referred to as the main GUI) for fuzzy retrieval is displayed on the color display 28. The 'Fuzzy Retrieval' here means a retrieval process for retrieving images without requiring the user's input of any keywords. As discussed later, however, the user may input one or a plurality of keywords, in order to limit the types of images to be retrieved (for example, the images of landscapes).

Figure 6:
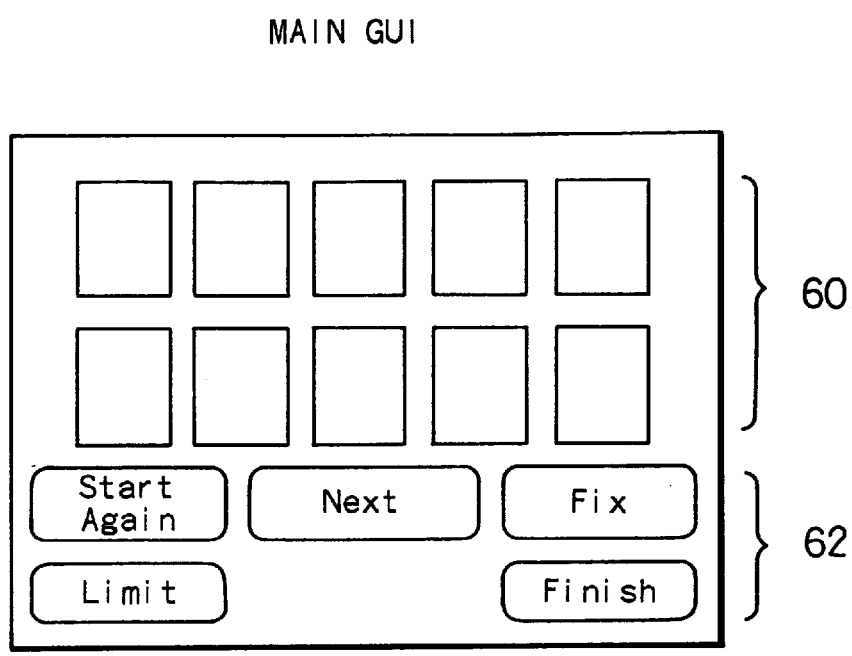
FIGS. 6(A) and 6(B) show an example of the main GUI.
Figure 6:
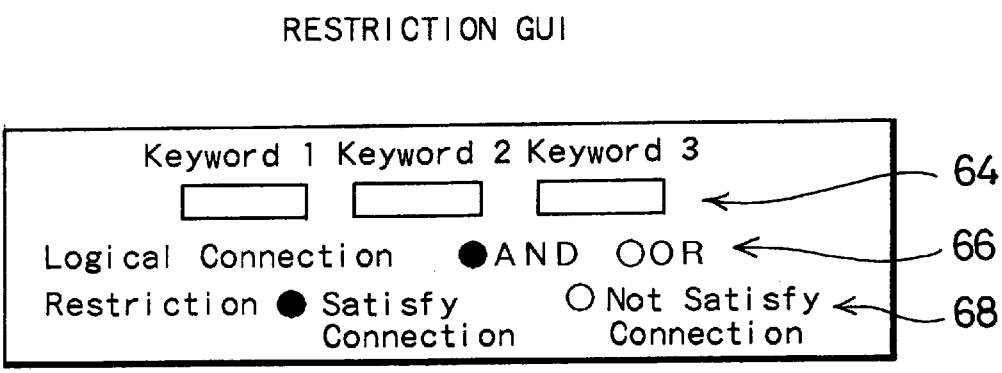

FIGS. 6(A) and 6(B) show an example of the main GUI. Referring to FIG. 6(A), a predetermined number of image frames 60 (10 image frames in this example) for displaying skipped images and a plurality of buttons 62 for the user to instruct a specific process are arranged in the main GUI. In this example, there are five buttons 62 of: 'Start Again', 'Next', 'Fix', 'Limit', and 'Finish'. The user clicks the 'Start Again' button to start the fuzzy retrieval all over again. The user clicks the 'Limit' button to limit the types of images to be retrieved with keywords, prior to the start of fuzzy retrieval.

FIG. 6(B) shows a restriction graphical user interface displayed when the user clicks the 'Limit' button. The restriction GUI includes a plurality of fields 64 for input of keywords, buttons 66 for specifying a logical connection of keywords (logical product or logical sum), and restricting condition buttons 68. The restricting condition buttons 68 are used for selecting a restricting condition, that is, whether retrieval should be limited to the images that meet the logical connection of keywords or the images other than those meeting the logical connection of keywords. In this manner, the target of fuzzy retrieval can be limited according to the preset conditions based on the keywords. This restriction enables the subsequent fuzzy retrieval in a narrower sense (that is, the retrieval without input of any keywords) to be carried out more efficiently. The fuzzy retrieval in a narrower sense may alternatively be performed without such restriction with keywords.

The 'Next' button is used to instruct to display next candidate images on the screen. The detailed processing in response to a click of the 'Next' button will be discussed later. The 'Fix' button is used to instruct to definitely select one image (or a plurality of images) among the displayed images. The 'Finish' button is used to instruct to conclude the fuzzy retrieval.

At step S2 of FIG. 5, the user determines whether or not to restrict the range of retrieval. The processing of steps S3 and S4 is carried out when the range of retrieval is to be restricted. If the range of retrieval is not to be restricted, on the other hand, the procedure skips to step S5 discussed later. At step S3, the user pushes the 'Limit' button to display the restriction GUI shown in FIG. 6((B) on the color display 28. To 'push' implies clicking a selected button with the mouse 34. At step S4, the user inputs restricting conditions and clicks an OK button (not shown). This procedure limits the types of images to be subsequently retrieved (also referred to as next candidate images) to those meeting the restricting conditions.

At step S5, the user clicks the 'Next' button on the main GUI (see FIG. 6) to display a predetermined number of images (10 images in this example) on the color display 28. At this moment, the priority allocation unit 44 allocates priorities to a plurality of images to be displayed as next candidates. The 'plurality of images to be displayed as next candidates' imply the images extracted by the limiting process if executed, or all the images included in the image database 38 when no limiting process is executed. The priorities allocated to the respective images are registered in an image data management table for tendency search phase.

FIGS. 7(A)–7(C) show a process of creating the image data management table for tendency search phase. The image data management table stores priorities of display (second priorities) for the respective images, which priorities are used to enable the user to observe images of various tendencies on the screen in the initial stage of the fuzzy retrieval. An object of this stage of retrieval is to tentatively select a predetermined number of images, and the stage is hereinafter referred to as 'tendency search phase'.

The image data management table includes image data numbers, priorities, and selection/display state flags. The image data numbers are serial numbers allocated to the respective images which are to be displayed as next candidates. The priorities are used in displaying the respective images of next candidates on the screen in the tendency search phase. In FIG. 7, for the matter of convenience, the symbol '#' is added before the image data numbers and the symbol '*' is added before the priorities. The selection display state flag represents one of four states regarding selection and display of each image. "0" level of the flag shows that the image has not yet been displayed; "1" level of the flag shows that the image has been displayed once but not been tentatively selected by the user; "2" level of the flag shows that the image is being displayed in a non-selected condition; and "3" level of the flag shows that the image is being displayed in a tentatively selected condition.

The image data management table for tendency search phase is created in the following manner. At a first step, the image data numbers of all the images to be displayed as next candidates are listed up and a table shown in FIG. 7(A) is obtained. In this example, it is assumed that the limiting process has been carried out to restrict the number of images as the next candidates to R, where R is an integer of not less than 2. In the state of FIG. 7(A), the priorities have not yet been allocated and the selection/display state flags have been cleared to zero. At a next step, random numbers are allocated to the R pieces of images as the priorities. The images are then sorted in the ascending order of the priorities. This gives the image data management table, in which the images are rearranged in the ascending order of the priorities as shown in FIG. 7(C). As clearly understood from the above description, the priorities in the image data management table for tendency search phase are allocated to the respective images in such a manner that the images with close relationships are not successively displayed.

After the image data management table is created in the above manner, the candidate image arrangement unit 46 displays the predetermined number of images (10 images) on the color display 28 according to the priorities registered in this table. In this embodiment, ten images to which the priorities *1 to *10 have been allocated are displayed first. The selection/display state flag is set equal to 2 ("being displayed in non-selected state") for these displayed images.

FIGS. 8(A)–8(C) show a process of displaying a variety of images on the main GUI in the course of fuzzy retrieval. FIG. 8(A) shows the state in which first ten images are displayed. Referring back to the flowchart of FIG. 5, at step S6, it is determined whether or not there is any image that perfectly satisfies the user's requirements. When there is an image that completely meets the user's requirements, the user clicks the 'Fix' button on the main GUI to definitely select the image at step S7. The fuzzy retrieval process of FIG. 5 is concluded when the image is definitely selected.

When there is no image that completely meets the user's requirements, on the other hand, the user determines whether or not there are any images that are close to the user's requirements at step S8. When there is an image that is close to the user's requirements, the user clicks the mouse 34 in the frame of the image to tentatively select it at step S9. The 'tentatively selecting' here implies that the image is not definitely selected but only tentatively selected as what is close to the user's requirements.

The tentatively selected images are displayed in a distinguishable manner from the images that have not been tentatively selected. In the example of FIG. 8(A), an image Ms1 on the second left in the upper row and an image Ms2 on the fourth left in the lower row are tentatively selected and displayed in bold frames. A variety of other techniques may be applied to display the tentatively selected images in a distinguishable manner; for example, the frames of the tentatively selected images may be filled with a different color from the color of the frames of non-selected images, or the frames of the tentatively selected images may be blinked. The selection states of the previously selected images may be canceled (that is, changed to the non-selected condition) at step S9. After the tentative selection (or non-selection) of images at step S9, the program returns to step S5. The processing of step S5 and subsequent steps under such conditions will be discussed later.

When it is determined at step S8 that no displayed images are close to the user's requirements, on the other hand, the user determines whether or not the fuzzy retrieval should be started all over again at step S10. When the user clicks the 'Start Again' button on the main GUI at step S11, the program returns to step S2 and repeats the processing of step S2 and subsequent steps. When the user does not click the 'Start Again' button, on the contrary, the user determines whether or not the fuzzy retrieval should be concluded at step S12. When desiring to finish, the user clicks the 'Finish' button at step S13 to conclude the fuzzy retrieval. When the user desires to continue the fuzzy retrieval, on the other hand, the program returns to step S2 and repeats the processing of step S2 and subsequent steps.

The following describes the processing executed at step S5 when the user tentatively selects a plurality of images. Although the processing of steps S2 through S4 may be carried out when a plurality of images are tentatively selected, for the clarity of explanation, it is here assumed that the processing of steps S2 through S4 is not executed.

When the user clicks the 'Next' button while two images are tentatively selected as shown in FIG. 8(A), the candidate image arrangement unit 46 refers to the image data management table for tendency search phase (FIG. 7(C)) and updates the next candidate images as shown in FIG. 8(B). The updating process arranges the two tentatively selected images Ms1 and Ms2 at the head of the rows and arranges the images of next candidates after the images Ms1 and Ms2 according to their priorities.

The registration in the image data management table is updated with a change in the state of tentative selection or the state of display of images. As for the two images Ms1 and Ms2 displayed in the tentatively selected state, their selection/display state flags are set equal to 3 ("being displayed in tentatively selected state") in the image data management table. As for the eight images displayed in the non-selected state, on the other hand, the selection/display state flags are set equal to 2 ("being displayed in non-selected condition"). As for the images that have been displayed but not tentatively selected in the state of FIG. 8(A), the selection/display state flag is set equal to 1 ("once displayed but not selected").

In this manner, the ten images, which consist of the two tentatively selected images Ms1 and Ms2 and the eight images of next candidates, are rearranged and displayed at step S5. The user can additionally select the images that are close to the user's requirements in a tentative manner (or select in a definite manner) among these displayed images.

Consider that the user tentatively selects an image Ms3 on the right end in the lower row in the state of FIG. 8(B),. When the user clicks the 'Next' button at step S5 while three or more images are tentatively selected, the common keyword extraction unit 42 extracts common keywords that are common to the plurality of the tentatively selected images Ms1, Ms2, and Ms3. Priorities (first priorities) are then reallocated to the next candidate images based on the closeness of relations to the common keywords, and the next candidate images are displayed while arranged according to the newly allocated priorities. FIG. 8(C) shows images redisplayed after the above processing. In the example of FIG. 8(C), the three tentatively selected images are all related to mountains and have a common general class keyword 'Mountain' as the texture keyword. All the seven subsequent images displayed as next candidates in FIG. 8(C) accordingly include mountains.

If there is an image that perfectly satisfies the user's requirements among the images displayed in FIG. 8(C), that image is definitely selected at step S7 in the flowchart of FIG. 5. If there are no images that perfectly satisfy the user's requirements, on the other hand, the processing of step S8 and subsequent steps is carried out again. When there is any image that is close to the user's requirements, the image may be added to the images of tentative selection at step S9.

The above embodiment can select and display as next candidates those images which have close relations to a common keyword common to a plurality of tentatively selected images even when the user does not specify any keyword. The user can thus readily retrieve an image that meets the user's requirements. The effect of the present invention is, however, not so significant when the user can explicitly specify images having close relations as in the example of FIGS. 8(A)–8(C). In such cases, direct input of a keyword by the user enhances the efficiency of retrieval. The present invention is especially effective when the user has ambiguous requirements and can not clearly specify a keyword.

As discussed previously, when the tentatively selected images are not greater than two, next candidate images are rearranged and displayed according to the priorities in the image data management table for tendency search phase (FIG. 7(C)). This mode is referred to as the 'tendency search phase'. When the tentatively selected images are not less than three and have relations to one another, next candidate images are displayed based on the common keyword that is common to the tentatively selected images. This mode is referred to as the 'relation extraction phase'.

Figure 9:
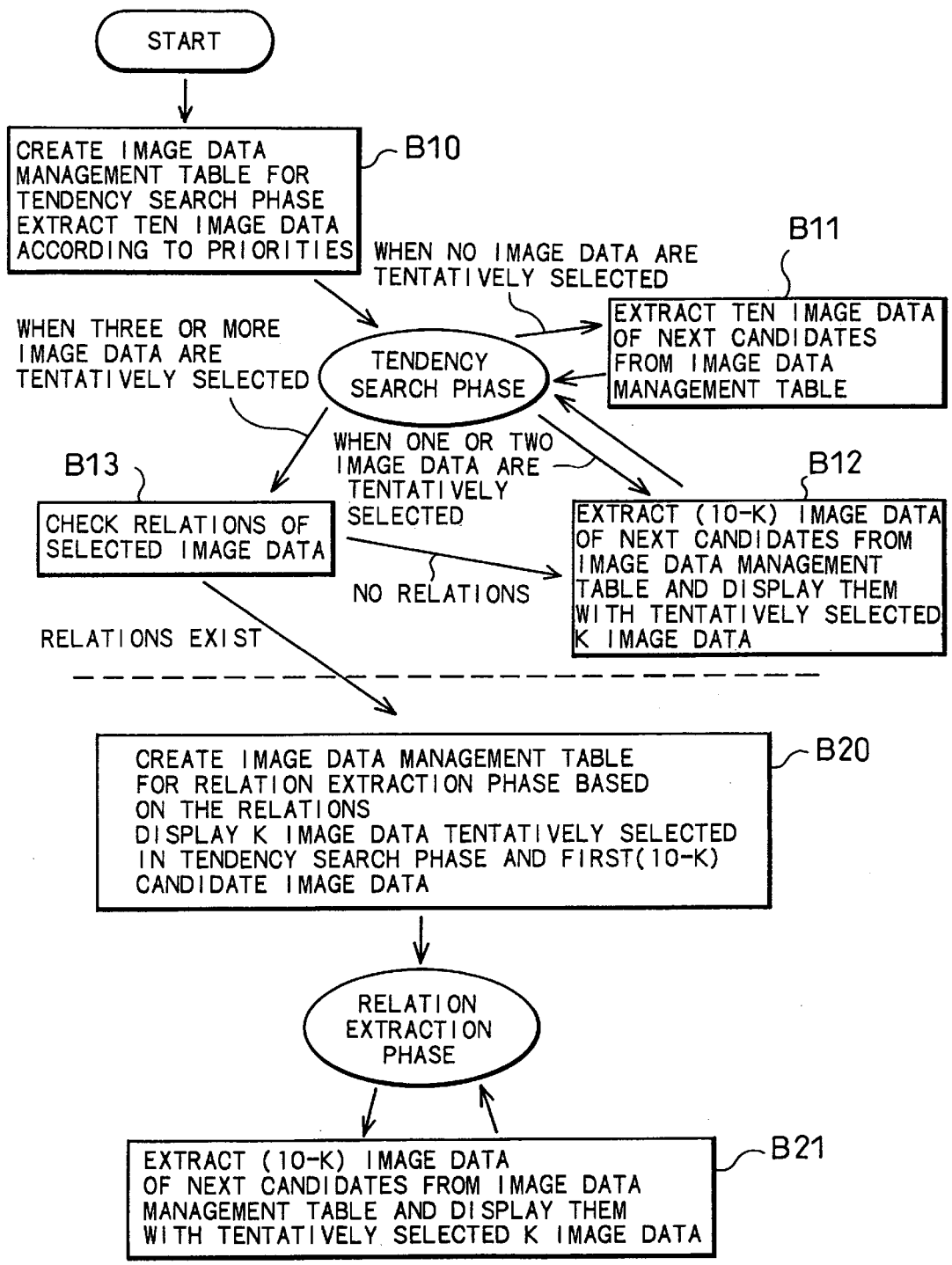
FIG. 9 shows the relationship between the tendency search phase and the relation extraction phase.

FIG. 9 shows the relationship between the tendency search phase and the relation extraction phase executed by the image retrieval unit 40. The retrieval is carried out in the tendency search phase in the initial stage of the fuzzy retrieval, and is shifted to the relation extraction phase after the user tentatively selects at least a predetermined number of related images (three images in the embodiment).

The tendency search phase includes four process blocks B10 through B13. The process block B10 creates the image data management table for tendency search phase (FIG. 7(A)) and displays ten images on the color display 28 based on this table. This is identical with the processing carried out at steps S5 and S6 in the flowchart of FIG. 5 discussed above.

The block B11 is carried out when no image is tentatively selected before an instruction is given to display next candidates at step S5 after first ten images are displayed. The process block B11 extracts next ten images from the image data management table for tendency search phase and displays them as next candidates on the screen. As for the previously displayed ten images, the selection/display state flags are set equal to 1 ("once displayed but not selected"). The selection/display state flags are set equal to 2 ("being displayed in non selected state") for the ten images newly extracted and displayed.

The block B12 is carried out when one or two images are tentatively selected. The process block B12 extracts (10-K) images having next priorities from the image data management table and displays them in addition to the tentatively selected K images, where K is 1 or 2. The ten images thus specified to be displayed are rearranged and displayed as shown in FIG. 8(C) discussed above.

The block B13 is carried out when the tentatively selected images are not less than three. The process block B13 checks the relations of the tentatively selected images. When it is determined that the tentatively selected images have some relations to one another, the retrieval is shifted to the relation extraction phase, in which a process block B20 is carried out. When it is determined that the tentatively selected image do not have any relations to one another, on the other hand, the process block B12 discussed above is carried out.

Figure 10:
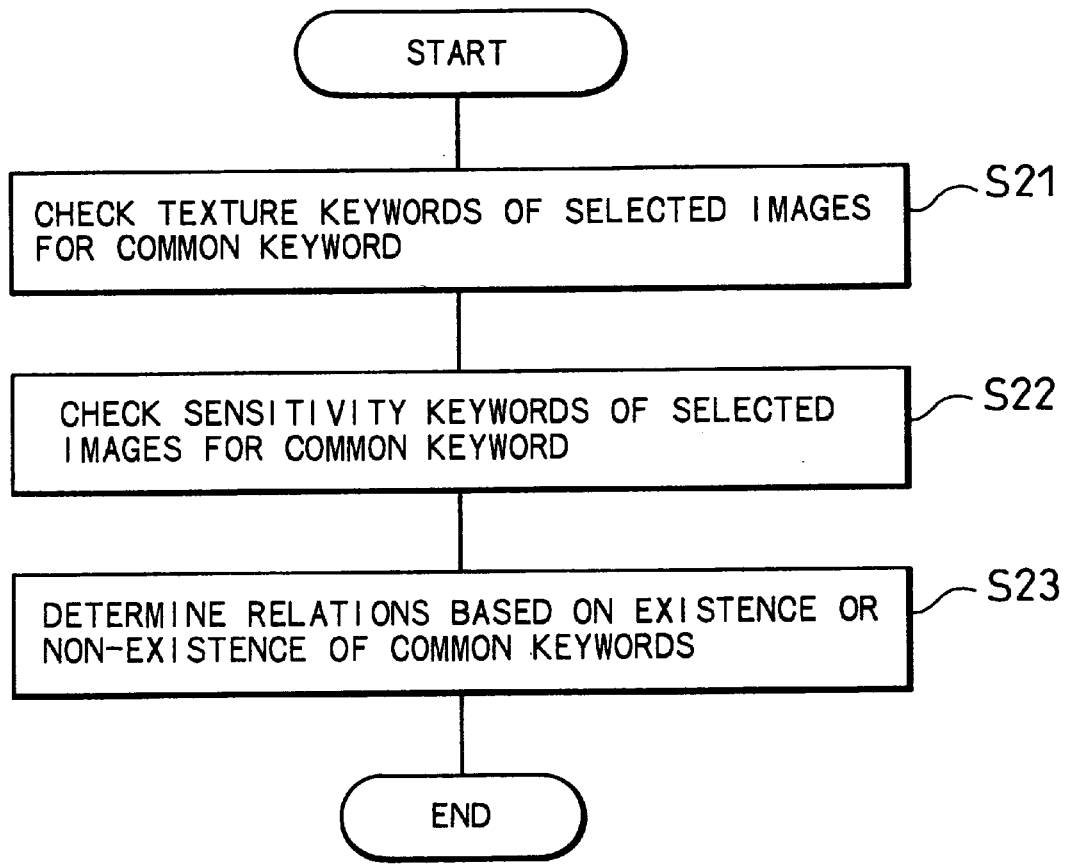
FIG. 10 is a flowchart showing a routine of checking the relations carried out in the block B13 of FIG. 9.

FIG. 10 is a flowchart showing a routine of checking the relations carried out in the block B13 of FIG. 9. The program first checks the texture keywords with respect to all the tentatively selected images and determines whether or not a common texture keyword exists at step S21. In accordance with a concrete procedure, it is determined whether or not all the tentatively selected images have at least one identical texture keyword. As shown in FIGS. 3(A)–3(D) discussed above, the texture keywords include general class keywords (first hierarchical keywords), concrete keywords (second hierarchical keywords), and related keywords. The processing of step S21 checks these three types of keywords. When all the tentatively selected images have an identical general class keyword, the general class keyword is registered as the common texture keyword. In the example of FIG. 8(C), the three tentatively selected images have the same general class keyword 'Mountain', which is accordingly registered as the common texture keyword. The same procedure is carried out for the concrete keywords and the related keywords.

Referring back to the flowchart of FIG. 10, at step S22, it is determined whether or not the tentatively selected images have a common sensitivity keyword. In accordance with a concrete procedure, the existence or non-existence of a common sensitivity keyword depends upon whether or not coordinates of the sensitivity keywords of all the tentatively selected images are within a predetermined range of distance. As shown in FIG. 4(B) described above, the sensitivity keywords are defined by the coordinate values in the sensitivity coordinate system. This means that the distances between the sensitivity keywords of the respective images can be calculated. If the coordinates of the sensitivity keywords of all the tentative selected images are within a predetermined range of distance, it is determined that a common sensitivity keyword exists. More concretely, when the sensitivity keywords of the respective images are within a range of a relatively small first value D1, the common keyword is registered as 'matching common keyword'. When the sensitivity keywords of the respective images are outside a range of the first value D1 but within a range of a relatively large second value D2, on the other hand, the common keyword is registered as 'proximate common keyword'. Distinction between the 'matching' and the 'proximate' is used in the process of allocating the priorities discussed later. Although distinction between the 'matching' and the 'proximate' is not necessarily required, such distinction ensures appropriate allocation of priorities to the images based on the relations.

If one or more common sensitivity keywords exist, representative coordinate values are calculated from the coordinates of the sensitivity keywords and registered as the coordinate values of the common sensitivity keyword. For example, the mean of the coordinate values of the sensitivity keywords of all the tentatively selected images may be used as the coordinate values of the common sensitivity keyword.

As shown in the above example, even when all the tentatively selected images do not have the same sensitivity keyword but have sensitivity keywords with high similarity, a representative sensitivity keyword is registered as 'common keyword'. In the specification hereof, the 'common keyword' common to a plurality of images is used in a broader sense and includes a representative keyword when the plurality of images have keywords with high similarity.

When no common keyword is found at either step S21 or step S22 in the flowchart of FIG. 10, it is determined at step S23 that the tentatively selected images do not have any relations to one another. When a common keyword is found at least at either step S21 or step S22, on the other hand, it is determined at step S23 that the tentatively selected images have some relations to one another. If the process of FIG. 10 determines existence of the relations in the block B13 of FIG. 9, the processing is shifted to the block B20. If the process determines non existence of the relations, on the contrary, the processing is returned to the block B12.

Referring back to FIG. 9, the process block B20 creates an image data management table for relation extraction phase based on the relations of the tentatively selected images, that is, based on the common keyword. The items included in the image data management table for relation extraction phase are identical with those in the image data management data for tendency search phase shown in FIGS. 7(A)–7(C) described above. The only difference is the method of allocating the priorities. In the table for relation extraction phase, the priorities are allocated to the respective images according to the relationship between the keywords of the images to be displayed as next candidates and the common keyword of the tentatively selected images. Namely smaller priority numbers (that is, higher priorities) are allocated to the images having a greater number of common keywords, whereas larger priority numbers (that is, lower priorities) are allocated to the images having a less number of common keywords. A concrete process of determining priorities in the image data management table for relation extraction phase will be described later.

The process block B20 then displays K images, where K is no more than 3, which are tentatively selected in the tendency search phase, and (10-K) images according to the priorities in the image data management table for relation extraction phase. FIG. 8(C) discussed above shows the resulting 10 images thus displayed.

When the process shifts to the relation extraction phase, a process block B21 shown in FIG. 9 is repeatedly executed in response to a click of the 'Next' button by the user at step S5.

The process block B21 displays the tentatively selected K images and the (10-K) next candidate images according to the priorities in the image data management table for relation extraction phase. Once the processing enters the relation extraction phase, the process of checking the relations (that is, the process of FIG. 10) is not required for the images tentatively selected afterwards. In the relation extraction phase, however, the process of checking the relations with the keywords of the tentatively selected images may be carried in response to an instruction of the user to do so or periodically, for example, every time or once per several times when an image is additionally selected. The checking of the relations in the relation extraction phase has an advantage that the images having the closer relations to the tentatively selected images can be displayed with a higher efficiency. Not to check the relations in the relation extraction phase, on the other hand, has another advantage that the rearranged images can be displayed more quickly.

FIGS. 11(A)–11(C) show successive displays of images when an image Ms4 on the center in the upper row is selected instead of the image Ms2 on the second right in the lower row during the first display shown in FIG. 8(A). Eight next candidate images displayed in the non-selected condition during a first redisplay shown in FIG. 11(B) are identical with those shown in FIG. 8(B). This is because that the first redisplay is carried out in the tendency search phase and the next candidate images are accordingly displayed irrespective of the common keywords of the tentatively selected images. When the image Ms3 on the right end in the lower row is added to the tentative selection in FIG. 11((B) and the user clicks the 'Next' button, the images are rearranged and displayed as shown in FIG. 11(C).

The three tentatively selected images Ms1, Ms4, and Ms3 in FIG. 11(C) include either a mountain or a river. As shown in the example of FIG. 3(C) described above, the images classified under the general class keyword 'Mountain' have both 'Mountain' and 'River' as the related keywords in a broader sense. The images classified under the general class keyword 'River' also have both 'Mountain' and 'River' as the related keywords in a broader sense. Namely the three tentatively selected images Ms1, Ms4, and Ms3 in FIG. 11(C) have the common related keywords of 'Mountain' and 'River'. In case that 'Woods' and 'Sea' are registered as the related keywords in the images classified under the general class keyword 'River', these related keywords are also registered as common keywords. In the relation extraction phase, next candidate images are displayed according to the priorities allocated based on such common keywords. In FIG. 11(C), images including the sea, mountains, a river, or woods are displayed as next candidates.

The processing of steps S2 through S12 in the flowchart of FIG. 5 is repeatedly executed until the fuzzy retrieval is concluded. The next candidate images extracted according to the priorities are displayed on the main GUI in addition to the images tentatively selected by the user. When there is any image that perfectly satisfies the user's requirements among the displayed images, the user definitely selects the image at step S7 and finishes the fuzzy retrieval.

As described above, when the user tentatively selects three or more images, the above embodiment extracts common keywords, which are common to the tentatively selected images, and reallocates the priorities based on the common keywords. Next candidate images are then successively displayed according to the reallocated priorities. Even when the user's requirements for retrieval of images are vague and the user can not specify any keyword, the images close to the user's requirements are successively displayed as next candidates. This enables efficient retrieval of a desired image.

B. Priorities in Image Data Management Table for Relation Extraction Phase

In the retrieval process in the relation extraction phase, the image data management table for relation extraction phase including the reallocated priorities is created, in order to enable the images having the closer relations to the common keywords to be successively displayed. When the restricting process has been executed at steps S3 and S4 in the flowchart of FIG. 5, only the images that satisfy the restricting conditions are registered in the image data management table for relation extraction phase. The images that have been displayed but not selected in the tendency search phase may be omitted from the objects of the processing in the relation extraction phase.

In the process of reallocating the priorities, a plurality of images registered in the image data management table for relation extraction phase are classified according to rules R1 through R5 given below. The rules R1 through R5 are applied in this sequence for classification. Concrete examples of classification will be described later. In this embodiment, it is assumed that the order of evaluation for the texture keyword and the sensitivity keyword in the classification (or in the allocation of priorities) is set as follows.

---

'Texture keyword' > 'Sensitivity keyword (matching)' >
'Related keyword' > 'Sensitivity keyword (proximate)'

---

First Rule R1

If a texture keyword $\alpha$ and a sensitivity keyword $\beta$ are registered as common keywords, the images are classified in the following manner:

First Group: images having the keywords of '$\alpha$ & $\beta$';

Second Group: images having the keywords of '$\alpha$ & not $\beta$';

Third Group: images having the keywords of 'not $\alpha$ & $\beta$'; and

Fourth Group: images having the keywords of 'not $\alpha$ & not $\beta$', where '&' represents a logical product and 'not' represents negative.

Second Rule R2

If a sensitivity keyword $\beta 1$ is registered as a common keyword, the images are classified in the following manner.

First Group: images having the keyword '$\beta 1$';

Second Group: images having the keyword '$\beta 2$ OR $\beta 3$'; and

Third Group: the other images, where $\beta 2$ and $\beta 3$ denote proximate keywords of the sensitivity keyword $\beta 1$, and 'OR' represents a logical sum.

Third Rule R3

If a concrete keyword a1 is registered as a common keyword, the images are classified in the following manner:

First Group: images having the keyword 'a1';

Second Group: images having the keyword 'a2';

Third Group: images having the keyword 'b1 OR b2'; and

Fourth Group: the other images, where the concrete keyword a1 is under a general class keyword A, a2 denotes another concrete keyword under the general class keyword A, and b1 and b2 denote concrete keywords under a general class keyword B, which is a related keyword of the general class keyword A.

Fourth Rule R4

If a general class keyword A is registered as a common keyword, the images are classified in the following manner:

First Group: images having the keyword 'a1 OR a2';

Second Group: images having the keyword 'b1 OR b2'; and

Third Group: the other images, where a1 and a2 denote concrete keywords under the general class keyword A, and b1 and b2 denote concrete keywords under a general class keyword B, which is a related keyword of the general class keyword A.

Fifth Rule R5

If related keywords are registered as common keywords, the images are classified in the following manner:

First Group: images having the keywords 'a1 OR a2 OR b1 OR b2'; and

Second Group: the other images, where the related keywords include general class keywords A and B, a1 and a2 denote concrete keywords under the general class keyword A, and b1 and b2 denote concrete keywords under the general class keyword B.

FIG. 12 shows an example of classification when the above rules R1 through R5 are applied successively. In this example, a concrete keyword a1 and a sensitivity keyword $\beta 1$ are registered as common keywords. Here the concrete keyword a1 is under a general class keyword A, a2 denotes another concrete keyword under the general class keyword A, b1 and b2 denote concrete keywords under a general class keyword B, which is a related keyword of the general class keyword A, and $\beta 2$ denotes a proximate keyword of the sensitivity keyword $\beta 1$. The term 'proximate keyword' means a sensitivity keyword existing in a predetermined range of distance from the common keyword $\beta 1$ in the sensitivity coordinate system.

Symbols R1, R2, and R3 written at the branch points of the classification tree shown in FIG. 12 represent rules applied to the respective branches. In the example of FIG. 12, all the images that are objects of allocation of the priorities are classified into twelve groups. Among these twelve groups, the smaller priority numbers (that is, higher priorities) are allocated to the upper groups.

FIG. 13 shows a second example of classification. In this example, a general class keyword A and a sensitivity keyword $\beta 1$ are registered as common keywords, and all the images are classified into nine groups.

FIG. 14 shows a third example of classification. In this example, related keywords A and B and a sensitivity keyword $\beta 1$ are registered as common keywords, and all the images are classified into six groups.

If a plurality of images are included in one group, relative priorities are given to such images. Any desirable method may be applied for allocation of the priorities in each group, but, for example, the priorities may be allocated at random. In this manner, the priorities are allocated to all the images registered in the image data management table for relation extraction phase.

As described above, in the image data management table for relation extraction phase, the smaller priority numbers (higher priorities) are allocated to the images having a greater number of common keywords. The larger priority numbers (lower priorities) are, on the other hand, allocated to the images having a less number of common keywords. If some images have the same number of common keywords, a smaller priority number is allocated to the image having a common keyword of a higher evaluation order, while a larger priority number is allocated to the image having a common keyword of a lower evaluation order. The images having the closer relations to the images tentatively selected in the tendency search phase are preferentially displayed according to these priorities.

After the reallocation of the priorities in the above manner, all the images included in the image data management table for relation extraction phase are sorted (or re-sorted) according to the new priorities. The selection/display flag is set equal to 3 ("being displayed in tentatively selected condition") for the images tentatively selected by the user in the tendency search phase. This completes the image data management table for relation extraction phase. Next candidate images are successively displayed according to the priorities in the image data management table. This feature enables the user to readily carry out retrieval and definitely select an image that perfectly meets the user's ambiguous requirements.

Part of the structure implemented by the hardware in the above embodiment may be replaced by software, while part of the structure implemented by the software, on the contrary, may be replaced by hardware.

A variety of modifications and changes are possible in the structure of keywords used in the above embodiment. For example, sensitivity keywords may be omitted. It is, however, preferable that at least one group of keywords include a first class keyword that has a direct relation to the contents of an image, and a second class keyword that does not have a direct relation to the contents of the image but has some indirect relation to the first class keyword. Among the texture keywords in the above embodiment, the general class keyword (or first hierarchical keyword) and the concrete keyword (or second hierarchical keyword) correspond to the first class keywords of the present invention, and the related keyword corresponds to the second class keyword.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of retrieving a desired image from an image database, the image database storing a plurality of images and keywords of the plurality of images, the method comprising the steps of:
   (a) displaying at least part of a number of images stored in the image database on a display device and tentatively selecting at least a predetermined number of images among the images displayed on the display device;
   (b) checking keywords of the tentatively selected images to extract a common keyword that is common to the tentatively selected images;
   (c) allocating first priorities to a plurality of images-to-be-displayed as next candidates based on closeness of each image to the common keyword;
   (d) displaying the tentatively selected images as well as at least part of the plurality of images-to-be-displayed as next candidates on the display device according to the first priorities; and
   (e) definitely selecting at least one image among the images displayed on the display device.

2. A method in accordance with claim 1, wherein
   when the tentatively selected images have a plurality of common keywords, the step (c) allocates the first priority to each of the plurality of images-to-be-displayed as next candidates at least according to the number of the common keywords possessed by each of the plurality of images-to-be-displayed.

3. A method in accordance with claim 2, wherein an evaluation order to be used in the allocation of the first priority is determined in advance with respect to various types of the plurality of common keywords; and
   the step (c) allocates the first priority to each of the plurality of images-to-be-displayed as next candidates according to the number of the common keywords possessed by each of the plurality of images and the evaluation order.

4. A method in accordance with claim 3, wherein
   the keywords are classified into a first class keyword that has a direct relation to the contents of each image and a second class keyword that has no direct relation to the contents of the image but has a relation to the first class keyword; and
   the first class keyword has a higher evaluation order than that of the second class keyword.

5. A method in accordance with claim 1, the method further comprising the step of:
   extracting the images-to-be-displayed as next candidates from the image database in advance through retrieval with an input keyword.

6. A method in accordance with claim 1, wherein the step (a) comprises the steps of:
   allocating second priorities for tentative selection to the images-to-be-displayed on the display device, so as not to display images having close relations to one another in a successive manner; and
   successively displaying the images-to-be-displayed on the display device according to the second priorities.

7. A method in accordance with claim 6, wherein
   when the number of the tentatively selected images is less than the predetermined number, the step (a) displays the tentatively selected images and other images according to the second priorities.

8. A method in accordance with claim 1, wherein the step (d) comprises the steps of:
   adding another tentatively selected image from the displayed images; and
   displaying all the tentatively selected images and other images according to the first priorities.

9. An apparatus for retrieving a desired image from an image database, the image database storing a plurality of images and keywords of the plurality of images, the apparatus comprising:
   a display device;
   first selection means for displaying at least part of a number of images stored in the image database on the display device and tentatively selecting at least a predetermined number of images among the images displayed on the display device;
   common keyword extraction means for checking keywords of the tentatively selected images to extract a common keyword that is common to the tentatively selected images;
   priority allocation means for allocating first priorities to a plurality of images-to-be-displayed as next candidates based on closeness of each image to the common keyword;
   candidate image arrangement means for displaying the tentatively selected images as well as at least part of the plurality of images-to-be-displayed as next candidates on the display device according to the first priorities; and
   second selection means for definitely selecting at least one image among the images displayed on the display device.

10. An apparatus in accordance with claim 9, wherein when the tentatively selected images have a plurality of common keywords, the priority allocation means allocates the first priority to each of the plurality of images-to-be-displayed as next candidates at least according to the number of the common keywords possessed by each of the plurality of images-to-be-displayed.

11. An apparatus in accordance with claim 10, wherein an evaluation order to be used in the allocation of the first priority is determined in advance with respect to various types of the plurality of common keywords; and the priority allocation means allocates the first priority to each of the plurality of images-to-be-displayed as next candidates according to the number of the common keywords possessed by each of the plurality of images and the evaluation order.

12. An apparatus in accordance with claim 11, wherein the keywords are classified into a first class keyword that has a direct relation to the contents of each image and a second class keyword that has no direct relation to the contents of the image but has a relation to the first class keyword; and the first class keyword has a higher evaluation order than that of the second class keyword.

13. An apparatus in accordance with claim 9, the apparatus further comprising:

restriction means for extracting the images-to-be-displayed as next candidates from the image database in advance through retrieval with an input keyword.

14. An apparatus in accordance with claim 9, wherein the first selection means comprises:

means for allocating second priorities for tentative selection to the images-to-be-displayed on the display device, so as not to display images having close relations to one another in a successive manner; and means for successively displaying the images-to-be-displayed on the display device according to the second priorities.

15. An apparatus in accordance with claim 14, wherein when the number of the tentatively selected images is less than the predetermined number, the first selection means displays the tentatively selected images and other images according to the second priorities.

16. An apparatus in accordance with claim 9, wherein the candidate image arrangement means comprises:

means for adding another tentatively selected image from the displayed images; and means for displaying all the tentatively selected images and other images according to the first priorities.

17. A computer program product for retrieving a desired image from an image database, the image database storing a plurality of images and keywords of the plurality of images, the computer program product comprising:

a computer readable medium; and a computer program stored on the computer readable medium, the computer program comprising:

a first program for causing a computer to display at least part of a number of images stored in the image database on a display device and to tentatively select at least a predetermined number of images among the images displayed on the display device;

a second program for causing the computer to check keywords of the tentatively selected images to extract a common keyword that is common to the tentatively selected images;

a third program for causing the computer to allocate first priorities to a plurality of images-to-be-displayed as next candidates based on closeness of each image to the common keyword;

a fourth program for causing the computer to display the tentatively selected images as well as at least part of the plurality of images-to-be-displayed as next candidates on the display device according to the first priorities; and a fifth program for causing the computer to definitely select at least one image among the images displayed on the display device.

* * * * *